(12) United States Patent
Hatakeyama et al.

(10) Patent No.: US 9,231,507 B2
(45) Date of Patent: Jan. 5, 2016

(54) MOTOR DRIVING CURCUIT AND PERMANENT MAGNET SYNCHRONOUS MOTOR

(75) Inventors: Kazunori Hatakeyama, Tokyo (JP); Michio Yamada, Tokyo (JP); Hiroki Aso, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 16 days.

(21) Appl. No.: 14/369,733

(22) PCT Filed: Jan. 27, 2012

(86) PCT No.: PCT/JP2012/051827
§ 371 (c)(1),
(2), (4) Date: Jun. 30, 2014

(87) PCT Pub. No.: WO2013/111326
PCT Pub. Date: Aug. 1, 2013

(65) Prior Publication Data
US 2015/0002061 A1   Jan. 1, 2015

(51) Int. Cl.
*H02P 6/00* (2006.01)
*H02P 6/18* (2006.01)
(Continued)

(52) U.S. Cl.
CPC *H02P 6/18* (2013.01); *H02P 6/001* (2013.01); *H02P 6/145* (2013.01); *H02P 6/20* (2013.01); *H02P 2207/05* (2013.01)

(58) Field of Classification Search
CPC ........ H02P 21/0039; H02P 6/18; H02P 6/001
USPC ............ 318/400.01, 400.02, 400.06, 400.07, 318/400.14, 400.15, 599, 700, 701, 721, 318/799, 800, 801, 430, 432, 437; 388/800, 388/819, 823; 310/12.24, 49.32
See application file for complete search history.

(56) References Cited

U.S. PATENT DOCUMENTS 6,388,416 B1 * 5/2002 Nakatani et al. ............... 318/700
6,534,948 B2 * 3/2003 Ohura et al. ................... 318/798
(Continued)

FOREIGN PATENT DOCUMENTS

JP    2002-101683 A   4/2002
JP    3360934 B2   10/2002
(Continued)

OTHER PUBLICATIONS

International Search Report of the International Searching Authority mailed Apr. 17, 2012 for the corresponding international application No. PCT/JP2012/051827 (with English translation).
(Continued)

*Primary Examiner* — Antony M Paul
(74) *Attorney, Agent, or Firm* — Posz Law Group, PLC

(57) ABSTRACT

A motor driving circuit includes a magnetic-pole-position detecting unit that detects a rotating position of a rotor of a permanent magnet synchronous motor, a voltage output unit that converts a direct-current voltage and generates a driving voltage for the permanent magnet synchronous motor, a voltage control unit that controls the voltage output unit on the basis of a comparison result of a modulation wave and a carrier wave, a voltage-phase adjusting unit that determines, using a differential amplifier circuit that receives a rotating speed control signal and an offset signal, a phase of the modulation wave generated by the voltage control unit and causes the voltage control unit to generate the modulation wave in the determined phase, and an offset generating unit that generates the offset signal.

16 Claims, 13 Drawing Sheets

(51) Int. Cl.
  *H02P 6/14* (2006.01)
  *H02P 6/20* (2006.01)

(56) References Cited

U.S. PATENT DOCUMENTS

| | | | |
|---|---|---|---|
| 6,694,287 B2* | 2/2004 | Mir et al. | 702/183 |
| 7,161,323 B2* | 1/2007 | Ajima et al. | 318/629 |
| 2006/0138994 A1* | 6/2006 | Cheng | 318/807 |
| 2012/0326646 A1 | 12/2012 | Tanaka et al. | |

FOREIGN PATENT DOCUMENTS

| | | |
|---|---|---|
| JP | 2003-324985 A | 11/2003 |
| JP | 2004-180399 A | 6/2004 |
| JP | 3713549 B2 | 9/2005 |
| JP | 2007-275827 A | 10/2007 |
| JP | 2009-303287 A | 12/2009 |
| JP | 4671331 B2 | 1/2011 |
| JP | 2011-45217 A | 3/2011 |
| JP | 2011-114995 A | 6/2011 |
| JP | 2011-145254 A | 7/2011 |
| WO | 2011/111262 A1 | 9/2011 |

OTHER PUBLICATIONS

Office Action issued Aug. 15, 2014 for the corresponding JP application No. 2013-555081 (with English translation).

* cited by examiner

MOTOR DRIVING CURCUIT AND PERMANENT MAGNET SYNCHRONOUS MOTOR

CROSS REFERENCE TO RELATED APPLICATION

This application is a U.S. national stage application of International Patent Application No. PCT/JP2012/051827 filed on Jan. 27, 2012.

TECHNICAL FIELD

The present invention relates to a motor driving circuit that drives a permanent magnet synchronous motor.

BACKGROUND

As a conventional motor driving circuit, there is a motor driving circuit that outputs an advance angle in three stages according to the voltage value of a speed command voltage (see, for example, Patent Literature 1).

There is also a motor driving circuit that generates a phase angle signal approximate to a polygonal line conforming to an optimum phase angle control characteristic corresponding to motor speed (see, for example, Patent Literature 2).

PATENT LITERATURE

Patent Literature 1: Japanese Patent Application Laid-Open No. 2011-114995
Patent Literature 2: Japanese Patent Application Laid-Open No. 2009-303287

Technical Problem

In the technology disclosed in Patent Literature 1, the advance angle is switched in a plurality of stages discretely rather than continuously according to the voltage value of the speed command voltage. Therefore, the advance angle suddenly changes at the timing of the switching. As a result, it is likely that damage to an apparatus due to a current increase and vibration of a motor due to speed fluctuation of a permanent magnet synchronous motor occur and cause unpleasant noise and the like.

In the technology disclosed in Patent Literature 2, the speed command voltage is divided by a voltage dividing resistor and the phase angle signal is generated on the basis of the divided voltage. Therefore, it is possible to continuously control the advance angle with respect to the speed command voltage. However, in an IC (Integrated Circuit) for driving used in general, a motor starts to rotate when the speed command voltage value is about 2 volts. Therefore, when the advance angle is generated at a divided voltage of 2 volts, for example, if the voltage division ratio is 0.5, a voltage of about 1 volt is input and the advance angle is controlled on the basis of the voltage. As a result, there is a problem in that the advance angle reaches an originally unnecessary advance angle amount during a low-speed rotation, and thus driving cannot be performed at an optimum operating point.

SUMMARY

The present invention has been devised in view of the above and it is an object of the present invention to obtain a motor driving circuit that realizes control for enabling the operation continuously according a speed command voltage and at an optimum operating point even during the low-speed rotation.

In order to solve the aforementioned problems, a motor driving circuit according to one aspect of the present invention is configured to include: a rotating-position detecting unit that detects a rotating position of a rotor of a permanent magnet synchronous motor; a voltage converting unit that converts a direct-current voltage and generates a driving voltage for the permanent magnet synchronous motor; a voltage control unit that generates a modulation wave on the basis of the rotating position and a rotating speed control signal for controlling rotating speed of the rotor and controls the voltage converting unit on the basis of a comparison result of the modulation wave and a carrier wave; a voltage-phase determining unit that determines, on the basis of the rotating speed control signal and an offset signal, a phase of the modulation wave generated by the voltage control unit and causes the voltage control unit to generate the modulation wave with the determined phase; and an offset generating unit that generates the offset signal, wherein the voltage-phase determining unit determines the phase with a differential amplifier circuit that receives the rotating speed control signal and the offset signal as inputs.

According to the motor control circuit according to the present invention, there is an effect that it is possible to control a motor at an optimum advance angle even in a state in which the rotating speed of the motor is low and it is possible to suppress an unnecessary current increase. Because an advance angle is continuously changed, there is an effect that it is possible to prevent occurrence of vibration and noise of the motor.

DETAILED DESCRIPTION

Embodiments of a motor driving circuit according to the present invention are explained in detail below with reference to the drawings. Note that the present invention is limited by the embodiments.

First Embodiment

Figure 1:
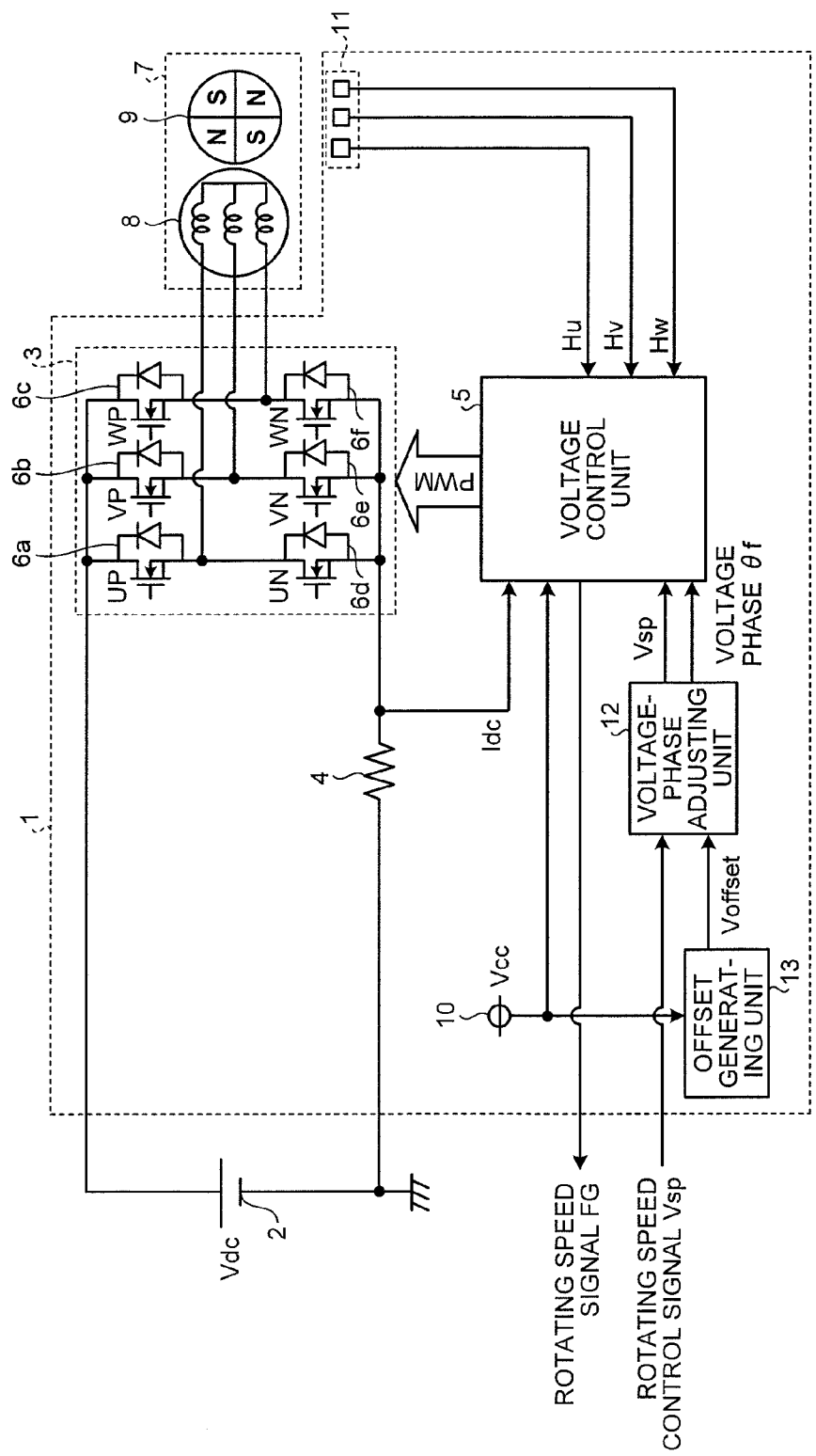
FIG. 1 is a diagram of a configuration example of a motor driving circuit in a first embodiment.

FIG. 1 is a diagram of a configuration example of a motor driving circuit in a first embodiment. A motor driving circuit 1 in this embodiment is a circuit that generates a driving voltage of a permanent magnet synchronous motor 7 on the basis of a direct-current voltage Vdc supplied from a direct-current power supply 2. The motor driving circuit 1 includes, as main components, a voltage output unit 3 that operates as a voltage converting unit, a voltage control unit 5, a magnetic-pole-position detecting unit 11 that operates as a rotating-position detecting unit, a voltage-phase adjusting unit 12 that operates as a voltage-phase determining unit, and an offset generating unit 13.

The voltage output unit 3 is electrically connected to the direct-current power supply 2 via a shunt resistor 4. The voltage output unit 3 drives opening and closing units 6a to 6f, each of which is composed of a reflux diode and a switching element connected in parallel to each other, in accordance with a PWM (Pulse Width Modulation) signal sent from the voltage control unit 5 and generates a voltage applied to a stator 8 configuring the permanent magnet synchronous motor 7. That is, the voltage output unit 3 applies a voltage to the winding of the stator 8 to generate a rotating magnetic field and drives a rotor 9 to rotate.

The voltage control unit 5 is driven by a control power supply 10. The voltage control unit 5 generates, on the basis of outputs Hu, Hv, and Hw of the magnetic-pole-position detecting unit 11, an output θf of the voltage-phase adjusting unit 12, and a direct current Idc detected by the shunt resistor 4, a PWM signal for driving the opening and closing units 6a to 6f and a rotating speed signal FG and outputs those signals. Note that the outputs Hu, Hv, and Hw of the magnetic-pole-position detecting unit 11 are signals that fluctuate according to the position (the magnetic pole position) of the rotor 9 of the permanent magnet synchronous motor 7. The magnetic-pole-position detecting unit 11 is configured by, for example, a magnetic sensor and changes the output values (Hu, Hv, and Hw) according to a measurement result of the magnetic field. Note that details of the magnetic-pole-position detecting unit 11 are not particularly specified. Any publicly-known configuration and magnetic position detecting method can be applied.

The voltage-phase adjusting unit 12 generates a voltage phase (a voltage advance angle) θf on the basis of a rotating speed control signal Vsp and an output Voffset of the offset generating unit 13.

Figure 2:
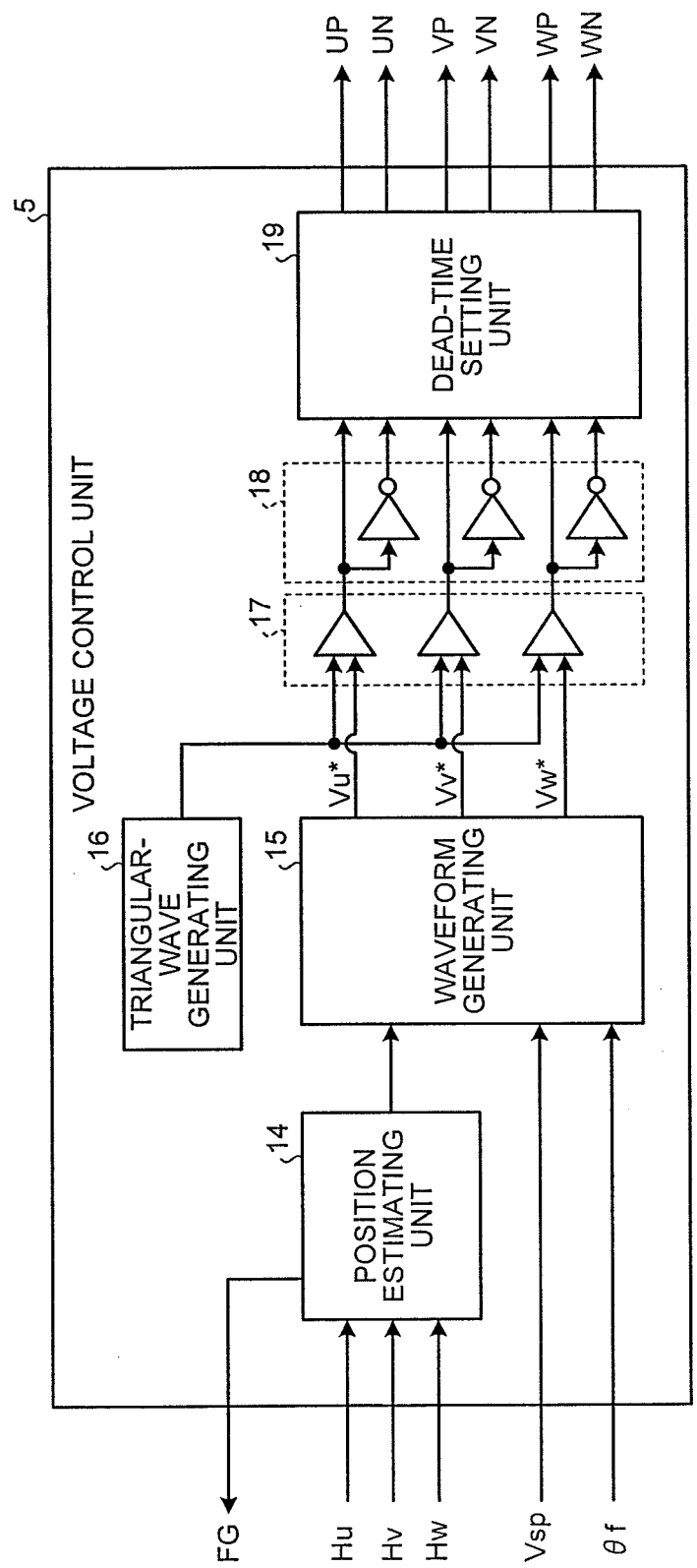
FIG. 2 is a diagram of a configuration example of a voltage control unit.

FIG. 2 is a diagram of a configuration example of the voltage control unit 5. The voltage control unit 5 includes a position estimating unit 14 that estimates a magnetic pole position on the basis of the outputs Hu, Hv, and Hw of the magnetic-pole-position detecting unit 11 and generates the rotating speed signal FG, a waveform generating unit 15 that generates waveform outputs Vu*, Vv*, and Vw* respectively corresponding to a U phase, a V phase, and a W Phase as modulation waves on the basis of an estimated position, which is an estimation result by the position estimating unit 14, the rotating speed control signal Vsp, and the voltage phase θf, a triangular-wave generating unit 16 that generates a triangular wave as a carrier wave, a comparing unit 17 that compares the waveform outputs Vu*, Vv*, and Vw* generated by the waveform generating unit 15 and the triangular wave generated by the triangular-wave generating unit 16 and outputs High or Low signals respectively corresponding to the U, V, and W phases, an inverting unit 18 that receives the signals output from the comparing unit 17, generates signals (inverted signals) obtained by inverting High and Low of the received signals, and outputs the inverted signals together with the signals (un-inverted signals) received from the comparing unit 17, and a dead-time setting unit 19 that receives the un-inverted signals and the inverted signals as inputs and sets dead times in the input signals (initial PWM signals) to prevent upper and lower units (6a and 6d, 6b and 6e, and 6c and 6f) of the opening and closing units 6a to 6f in the voltage output unit 3 from simultaneously changing to an ON state. The voltage control unit 5 outputs the signals after the setting of the dead times in the dead-time setting unit 19 as PWM signals (UP, VP, WP, UN, VN, and WN) for controlling the voltage output unit 3 (the opening and closing units forming the voltage output unit 3) and causes the opening and closing sections 6a to 6f of the voltage output unit 3 to operate to drive the permanent magnet synchronous motor 7.

Figure 3:
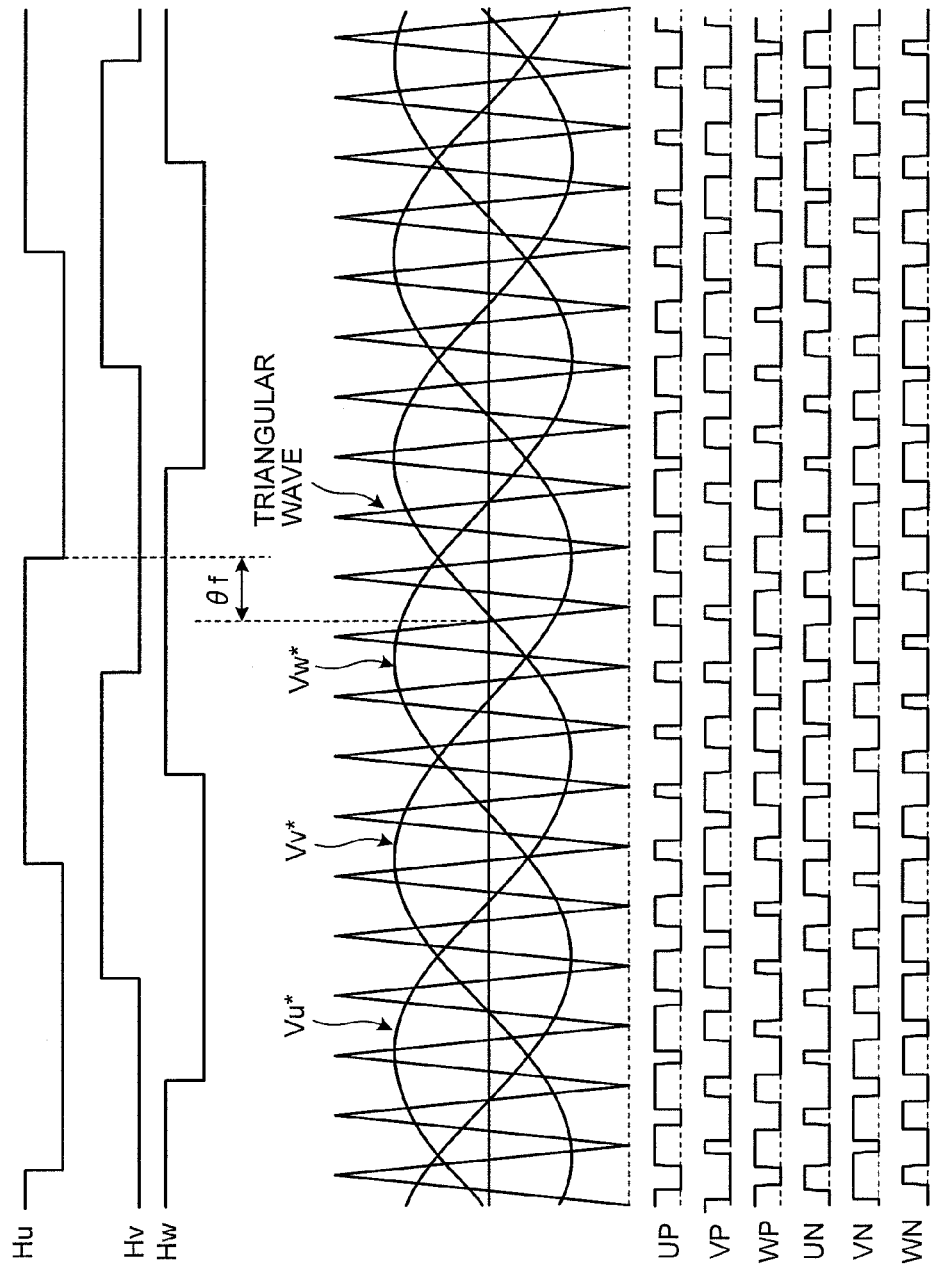
FIG. 3 is a diagram of an example of input and output timings of the voltage control unit.

FIG. 3 is a diagram of an example of input and output timings of the voltage control unit 5. When the rotor 9 of the permanent magnet synchronous motor 7 rotates, the position signals Hu, Hv, and Hw of the U, V, and W phases are generated in the magnetic-pole-position detecting unit 11. The voltage control unit 5 sets a rising edge zero cross of the U-phase waveform output Vu* having a substantially sine wave shape in, for example, a position to which a phase equivalent to the voltage phase θf has advanced from a falling edge of Hu set as a reference, and generates the waveform outputs Vv* and Vw* of the V phase and the W phase having a phase difference of ±120° with respect to the U phase. The voltage control unit 5 compares the generated waveform outputs Vu*, Vv*, and Vw* with the triangular wave (the triangular wave generated by the triangular-wave generating unit 16). For example, when Vu* is larger than the triangular wave, the voltage control unit 5 outputs High as UP and outputs Low as UN. The voltage control unit 5 calculates outputs for the V phase and the W phase in the same manner.

Note that, when the upper and lower opening and closing sections (UP and UN, VP and VN, and WP and WN) of the U, V, and W phases simultaneously change to the ON state and are short-circuited, an excessively large circuit flows to the driving circuit. Therefore, to prevent breakage of the driving circuit by the excessively large current, in general, a dead time, which is a short-circuit prevention time, is provided to obtain non-overlapping signals. In this embodiment, the waveform outputs Vu*, Vv*, and Vw* are the substantially sine waves. However, it goes without saying there is no problem in using methods generally used for motor control such as a method by third harmonic wave superimposition, spatial vector modulation, and two-phase modulation.

Figure 4:
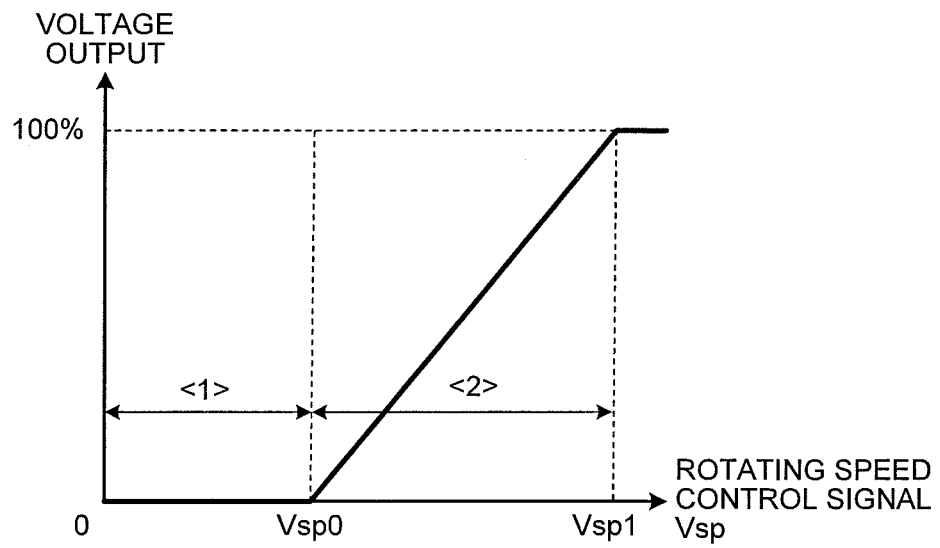
FIG. 4 is a diagram of a relation between a rotating speed control signal and a voltage output.

The voltage control unit 5 operates on the basis of the rotating speed control signal Vsp, the voltage advance angle θf, and the position signals Hu, Hv, and Hw. However, the voltage control unit 5 drives or does not drive the permanent magnet synchronous motor 7 according to only Vsp, and the voltage output of the voltage control unit 5 is as shown in FIG. 4. In FIG. 4, a section of <1> (0 to Vsp0) is a stopped state. When Vsp is increased to the boundary between the section of <1> and a section of <2> (Vsp0 to Vsp1) (when Vsp=Vsp0), a voltage output from the voltage output unit 3 is started and the permanent magnet synchronous motor 7 changes to a driving state. That is, an offset equivalent to Vsp0 is generated until the permanent magnet synchronous motor 7 actually starts driving after the motor driving circuit 1 starts operation, and the value of Vsp starts to increase. When Vsp exceeds Vsp0, the rotor 9 of the permanent magnet synchronous motor 7 starts rotation and the value of the rotating speed signal FG output from the position estimating unit 14 fluctuates. A circuit that generates Vsp (not shown in the figure) calculates the rotating speed of the rotor 9 on the basis of the rotating speed signal FG and controls Vsp to increase or decrease according to a difference between the calculated rotating speed and a target rotating speed to cause the rotor 9 to stably operate at the speed near the target rotating speed.

Figure 5:
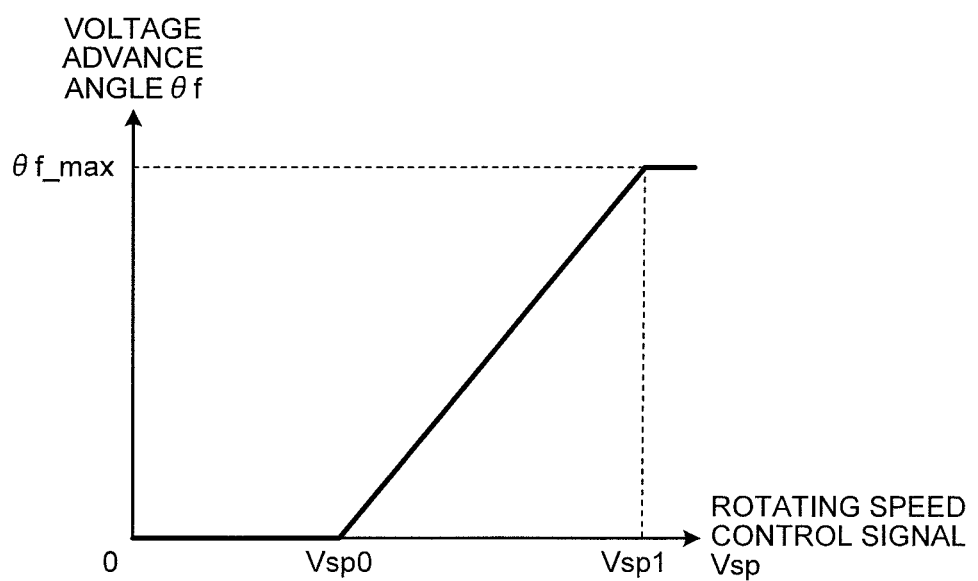
FIG. 5 is a diagram of a relation between the rotating speed control signal and a voltage advance angle.

An optimum relation between the rotating speed control signal Vsp and the voltage advance angle θf in an apparatus, a load of which increases according to the rotating speed, is shown in FIG. 5. As shown in the figure, in the optimum relation, θf increases from Vsp=Vsp0, with which the rotor 9 starts rotation, and reaches a maximum (θf_max) at Vsp=Vsp1, with which a voltage output is 100%. Therefore, in the motor driving circuit 1, the voltage-phase adjusting unit 12 generates the voltage advance angle θf having the relation of FIG. 5 with respect to Vsp and outputs the voltage advance signal θf to the voltage control unit 5. Consequently, it is possible to perform motor driving with highest efficiency and low noise.

Figure 6:
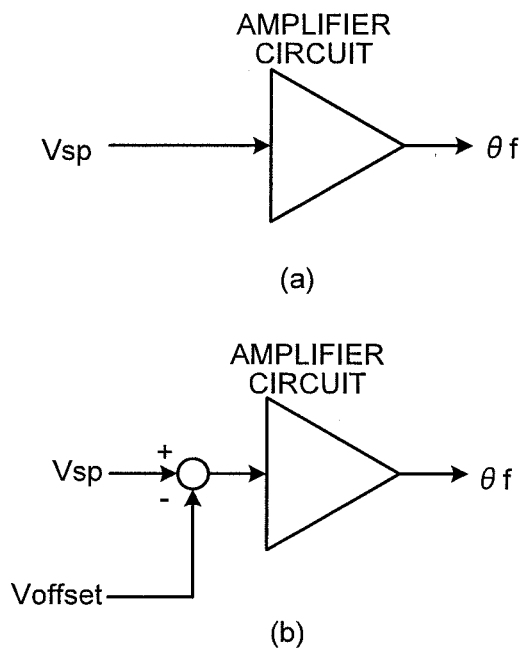
FIG. 6 is a diagram of a schematic configuration of a voltage-advance-angle-signal generating circuit.
Figure 7:
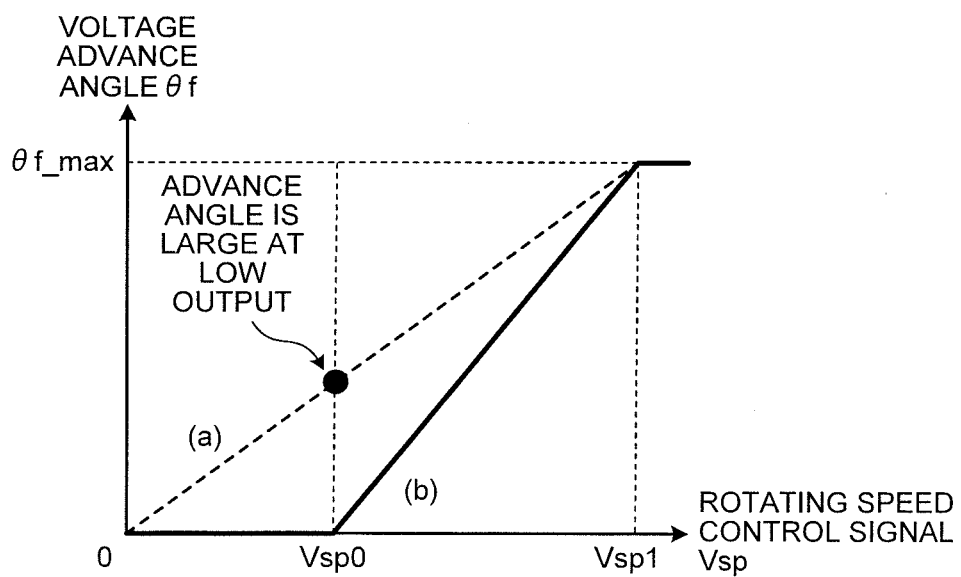
FIG. 7 is a diagram of a schematic operation of the voltage-advance-angle-signal generating circuit.

FIG. 6 and FIG. 7 are diagrams of schematic configurations and schematic operations of the voltage-phase adjusting unit 12 (for convenience of explanation, referred to as "voltage-advance-angle-signal generating circuit") in the related art and this embodiment. In FIG. 6, (a) shows the schematic of the conventional voltage-advance-angle-signal generating circuit and (b) shows the schematic of the voltage-advance-angle-signal generating circuit (the voltage-phase adjusting unit 12) in this embodiment. FIG. 7 shows a generation operation for the voltage advance angle signal (θf). (a) is the conventional operation and (b) is the operation in this embodiment.

When the conventional method (e.g., the method of Patent Literature 2) shown in FIG. 6(a) is applied, the rotating speed control signal Vsp is amplified by an amplifier circuit and output as θf. Therefore, for example, when Vsp=0 [V], θf=0°. However, the permanent magnet synchronous motor 7 actually starts driving after Vsp exceeds Vsp0. Therefore, as shown in FIG. 7(a), θf is not 0° at Vsp0 and a voltage advance angle greatly advances. Therefore, when the speed is low, deterioration in efficiency and an increase in noise are caused.

On the other hand, in the method in this embodiment, the rotating speed control signal Vsp is amplified by the amplifier circuit after the offset Voffset equivalent to Vsp0, with which a voltage output is started, is subtracted from Vsp. Therefore, it is possible to set θf to 0° at Vsp0, so that it is made possible to suppress deterioration in efficiency and an increase in noise when the speed is low. The voltage advance angle θf can be continuously changed. Therefore, when the voltage advance angle changes stepwise as in Patent Literature 1, the likelihood of damage to the apparatus due to a current change and occurrence of unpleasant noise due to speed fluctuation is reduced. It is possible to perform an operation with improved reliability.

Figure 8:
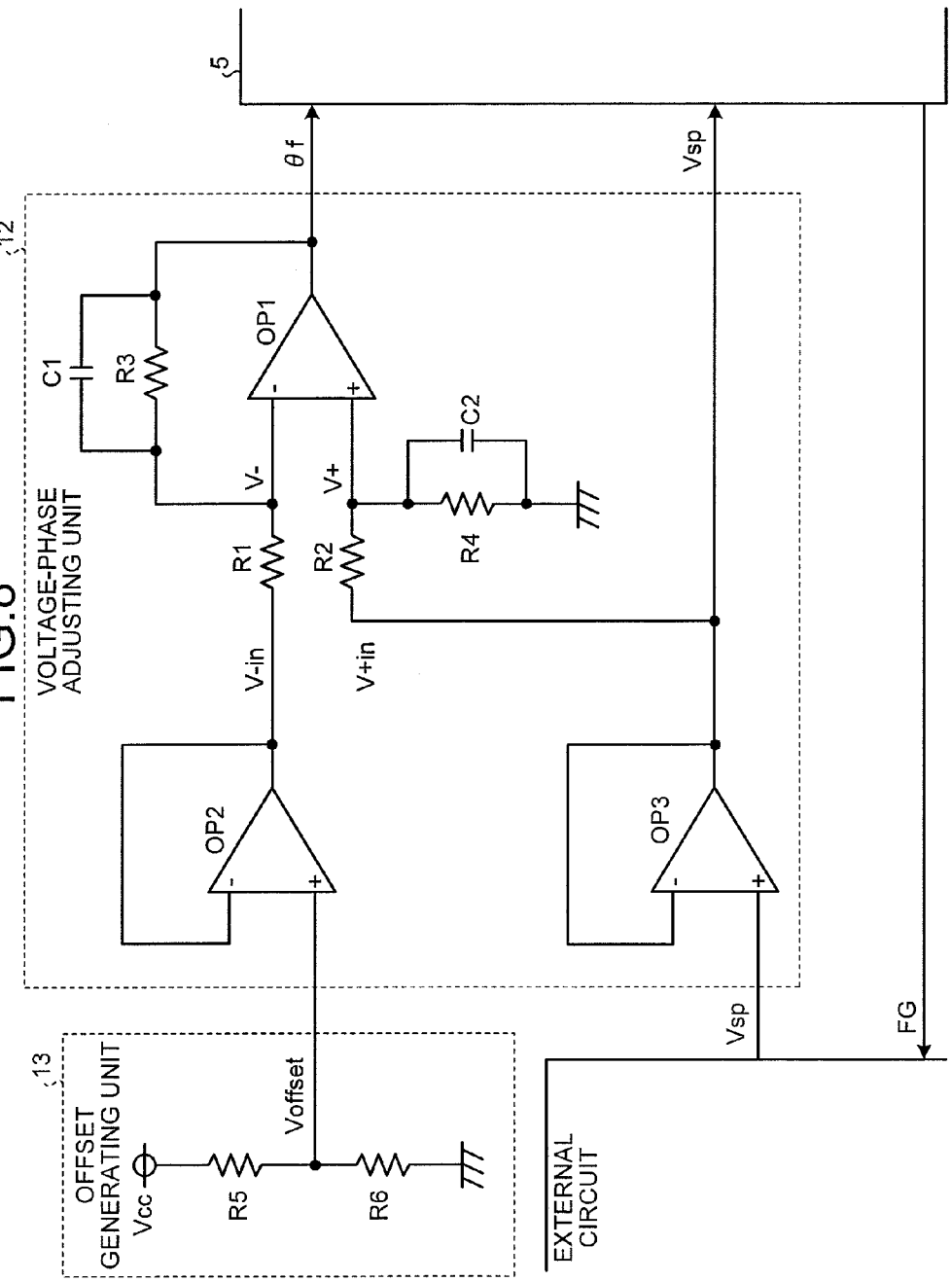
FIG. 8 is a diagram of a circuit configuration example of a voltage-phase adjusting unit and an offset generating unit in the first embodiment.

FIG. 8 is a diagram of a circuit configuration example of the voltage-phase adjusting unit 12 and the offset generating unit 13 of the first embodiment. The voltage-phase adjusting unit 12 includes a differential amplifier circuit formed by an operational amplifier OP1, resistors R1 to R4, and capacitors C1 and C2. Voltage follower circuits formed by operational amplifiers OP2 and OP3 are respectively connected to two input terminals (V+in and V−in) of the differential amplifier circuit to reduce the influence due to the impedance at a connection destination. Vsp is input to the V+in terminal via the voltage follower circuit formed by the OP3. The offset generating unit 13 is connected to the V−in terminal via the voltage follower circuit formed by the OP2. The differential amplifier circuit of the voltage-phase adjusting unit 12 amplifies a difference between the V+in terminal and the V−in terminal with a factor determined by resistance values of the resistors R1 to R4 and outputs the difference as the voltage advance angle θf. The offset generating unit 13 is configured to divide the control power supply 10 (Vcc) by resistors R5 and R6 and outputs the control power supply 10. It is possible to inexpensively generate an offset with a necessary minimum configuration. When it is desired to highly accurately control the voltage advance angle θf, accuracy of the offset is required. Therefore, the offset can be generated using an apparatus such as a shunt regulator.

Note that, in some case, θf is output at a voltage equal to or lower than about 1 volt even if a difference between V+in and V−in is, for example, near 0 because of a saturation voltage of the operational amplifier OP1. In that case, the offset generating unit 13 selects the offset Voffset taking the saturation voltage in to account. Consequently, it is possible to eliminate the influence of the saturation voltage.

In the voltage-phase adjusting unit 12 shown in FIG. 8, the voltage followers formed by the operational amplifiers OP2 and OP3 are used to reduce the influence of impedance. However, when the influence of impedance is small, the voltage followers can be omitted to attain a cost reduction. Because θf pulsates and the rotating speed is unstable because of the influence of noise, the capacitors C1 and C2 are provided to set a cutoff frequency of a low-pass filter formed by R3 and R4, which are connected in parallel, to the frequency equal to or lower than the frequency of the permanent magnet synchronous motor to attain stability of the rotating speed.

For example, when the voltage-phase adjusting unit 12 falls into an operation failure, the value of the voltage phase θf is unstable and a maximum efficiency operation cannot be performed. In this case, for example, if the voltage advance angle θf is excessively increased, the permanent magnet synchronous motor 7 performs a flux-weakening operation, and a voltage necessary for rotation decreases. Therefore, even when the rotating speed control signal Vsp is small, the rotating speed of the permanent magnet synchronous motor 7 increases. Further, because a flowing current also increases, in the worst case, it is likely that the motor driving circuit 1 and the permanent magnet synchronous motor 7 are broken. Therefore, a mechanism (not shown in the figure) for limiting one or both of a lower limit and an upper limit of the voltage advance angle θf output by the voltage-phase adjusting unit 12 can be provided. Consequently, it is made possible to prevent breakage of the motor driving circuit 1 and the permanent magnet synchronous motor 7 and attain an improvement of the reliability.

Note that, according to the improvement of the performance of ICs in recent years, the function for the limitation of the voltage advance angle θf is often incorporated in an IC configuring the voltage control unit 5. In that case, by using the function implemented in the voltage control unit 5, it is possible to limit the voltage advance angle θf without preparing a special circuit outside. Therefore, it is possible to attain not only the improvement of the reliability but also a cost reduction.

As explained above, in the motor driving circuit of this embodiment, the voltage-phase adjusting unit 12, which generates the voltage advance angle θf for designating the relation between the triangular wave serving as a carrier wave and the waveforms (Vu*, Vv*, and Vw*) set as comparison target with the triangular wave, generates the voltage advance angle θf on the basis of the rotating speed control signal (Vsp) and the offset value (Voffset) generated by the offset generating unit 13. The offset generating unit 13 generates an offset value for maintaining "θf=0" until the voltage output unit 3 starts a voltage applied to the permanent magnet synchronous motor 7, that is, until a value of the rotating speed control signal (Vsp) reaches the driving start point (Vsp0) of the permanent magnet synchronous motor 7. Consequently, even in a state in which the rotating speed of the permanent magnet synchronous motor 7 is low, it is made possible to set the voltage advance angle θf optimum for the rotating speed control signal Vsp, and also made possible to suppress an unnecessary current increase. Therefore, it is possible to suppress heat generation of the winding wire of the stator 8 configuring the permanent magnet synchronous motor 7. Even when the permanent magnet synchronous motor 7 including a high-efficiency rare earth magnet widely used in recent years is used, the likelihood of demagnetization due to high temperature decreases. It is possible to provide a driving circuit for a permanent magnet synchronous motor having high reliability.

Figure 9:
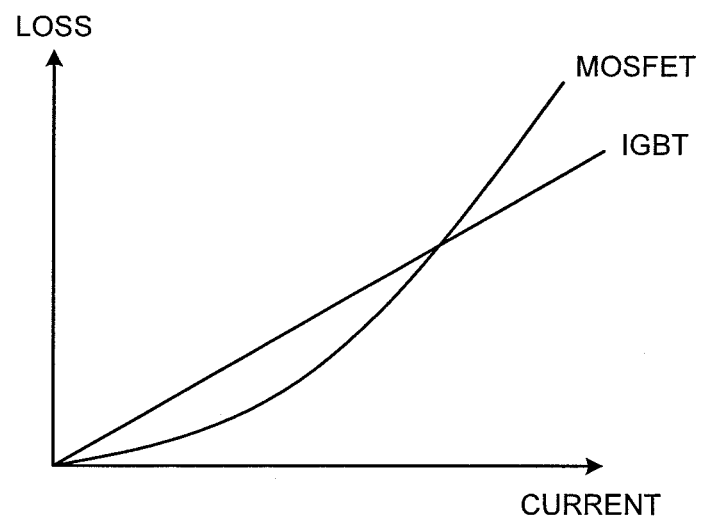
FIG. 9 is a diagram of a relation between an electric current and a loss of an IGBT and a MOSFET.

Because an electric current during operation is reduced, the switching elements configuring the opening and closing units 6a to 6f can be changed from IGBTs (Insulated Gate bipolar Transistors) to MOSFETs (Metal-Oxide-Semiconductor Field-Effect Transistors). As shown in FIG. 9, the MOSFET operates with a low loss in a low current region. Therefore, energy saving (high efficiency) can be realized by forming the opening and closing units 6a to 6f using the MOSFETs. In addition, because heat generation also decreases, it is possible to attain small design of the entire apparatus through a reduction in the size of heat radiation fins. It is possible to further reduce a loss by using a wide band gap semiconductor formed of SiC (Silicon Carbide), GaN, or diamond put to practical use in recent years or a MOSFET having a super junction structure, and thus it is made possible to increase the effect explained above. The reflux diodes configuring the opening and closing units 6a to 6f can be made by wide band gap semiconductor. A loss reducing effect can be obtained by using the MOSFET and the wide band gap semiconductor in a part (at least one) of the opening and closing units 6a to 6f.

The voltage-phase adjusting unit 12 continuously increases the voltage advance angle θf according to the rotating speed. Therefore, by applying the motor driving circuit to a ventilation fan or the like, the load of which increases according to the speed, the ventilation fan is operated at an optimum voltage advance angle. Therefore, it is possible to attain a reduction in noise during the low speed. During the high speed, it is possible to reduce an electric current flowing to the permanent magnet synchronous motor 7 and the voltage output unit 3. Therefore, the effect explained above can be obtained. Further, it is possible to prevent a voltage advance angle from suddenly changing. As a result, it is possible to stably control the speed of the ventilation fan. It is possible to improve the reliability.

Figure 10:
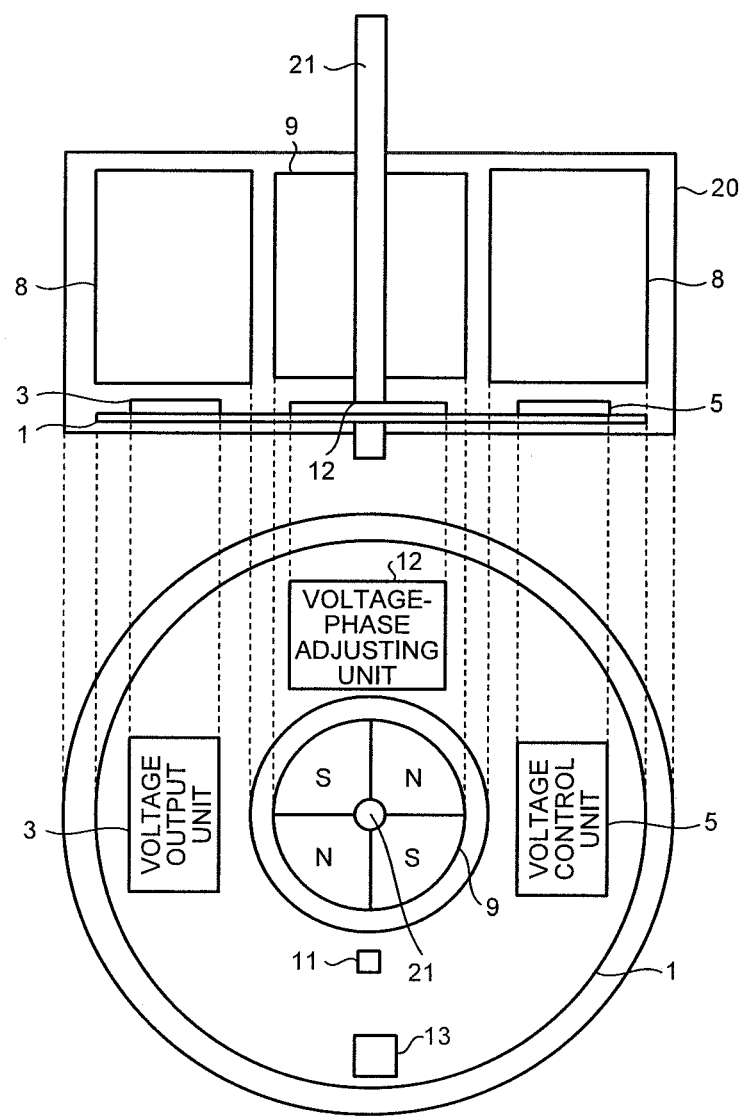
FIG. 10 is a diagram of an example of an integral configuration of a motor driving circuit and a permanent magnet synchronous motor.

Further, as shown in FIG. 10, the motor driving circuit 1 and the permanent magnet synchronous motor 7 are molded by mold resin 20. Consequently, the motor driving circuit 1 and the permanent magnet synchronous motor 7 are less easily affected by sand dust and water and the reliability is improved. Further, the dielectric strength of the permanent magnet synchronous motor 7 is improved. When a heavy load is connected to a shaft 21, heat generation is intense because a large current flows to the motor driving circuit 1 and the permanent magnet synchronous motor 7. However, when the motor driving circuit 1 and the permanent magnet synchronous motor 7 are molded, heat is radiated via the mold resin 20. Further, because a heat capacity increases, the motor driving circuit 1 and the permanent magnet synchronous motor 7 less easily generate heat, and it is possible to prevent thermal destruction of the motor driving circuit 1 due to the heat generation.

Second Embodiment

Figure 11:
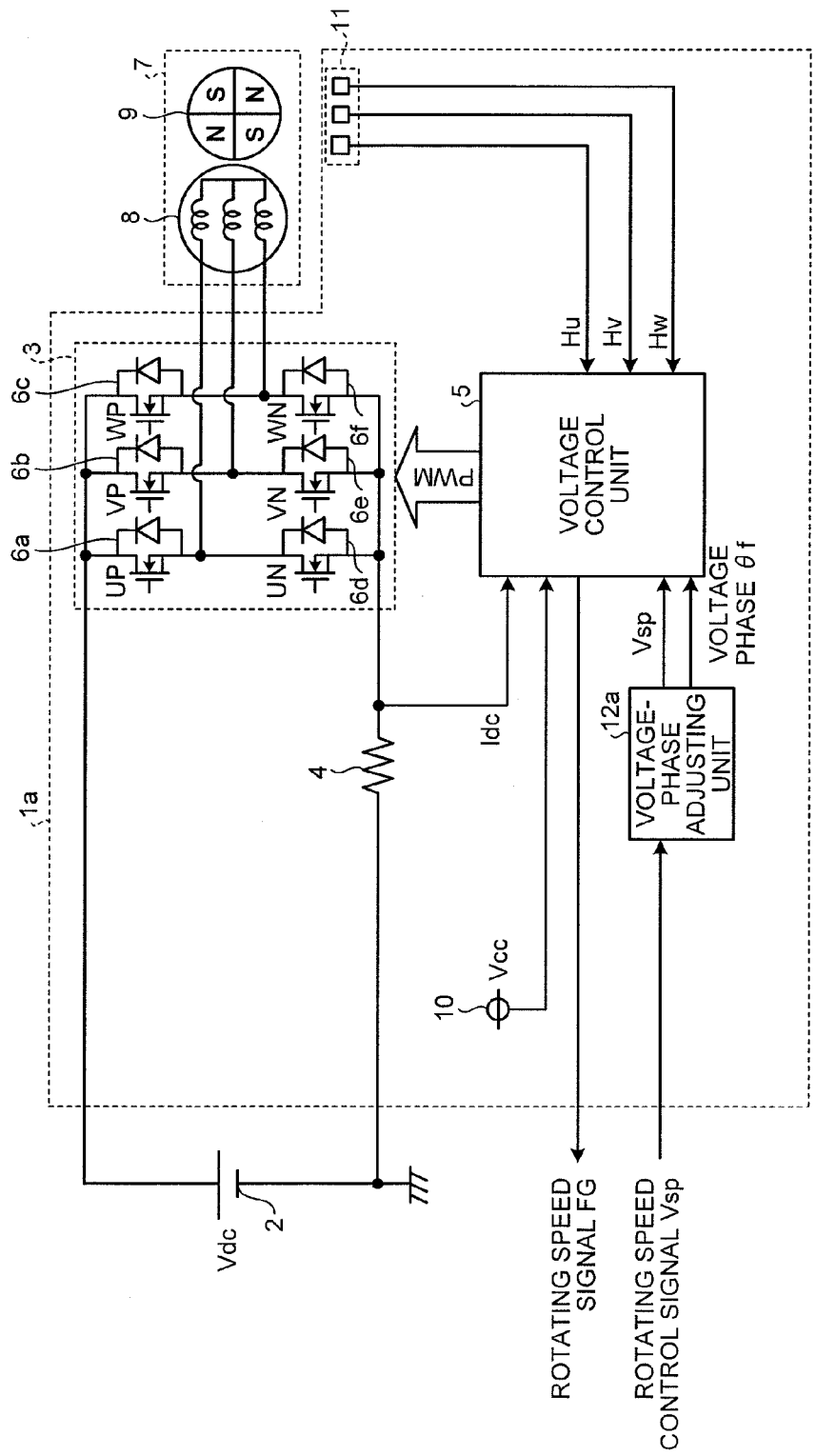
FIG. 11 is a diagram of a configuration example of a motor driving circuit in a second embodiment.

FIG. 11 is a diagram of a configuration example of a motor driving circuit in a second embodiment. In a motor driving circuit 1a in this embodiment, the offset generating unit 13 is removed from the motor driving circuit 1 in the first embodiment and the voltage-phase adjusting unit 12 is replaced with a voltage-phase adjusting unit 12a. The other components are the same as those in the first embodiment. Therefore, the components are denoted by the same reference numerals and signs and explanation of the components is omitted.

Figure 12:
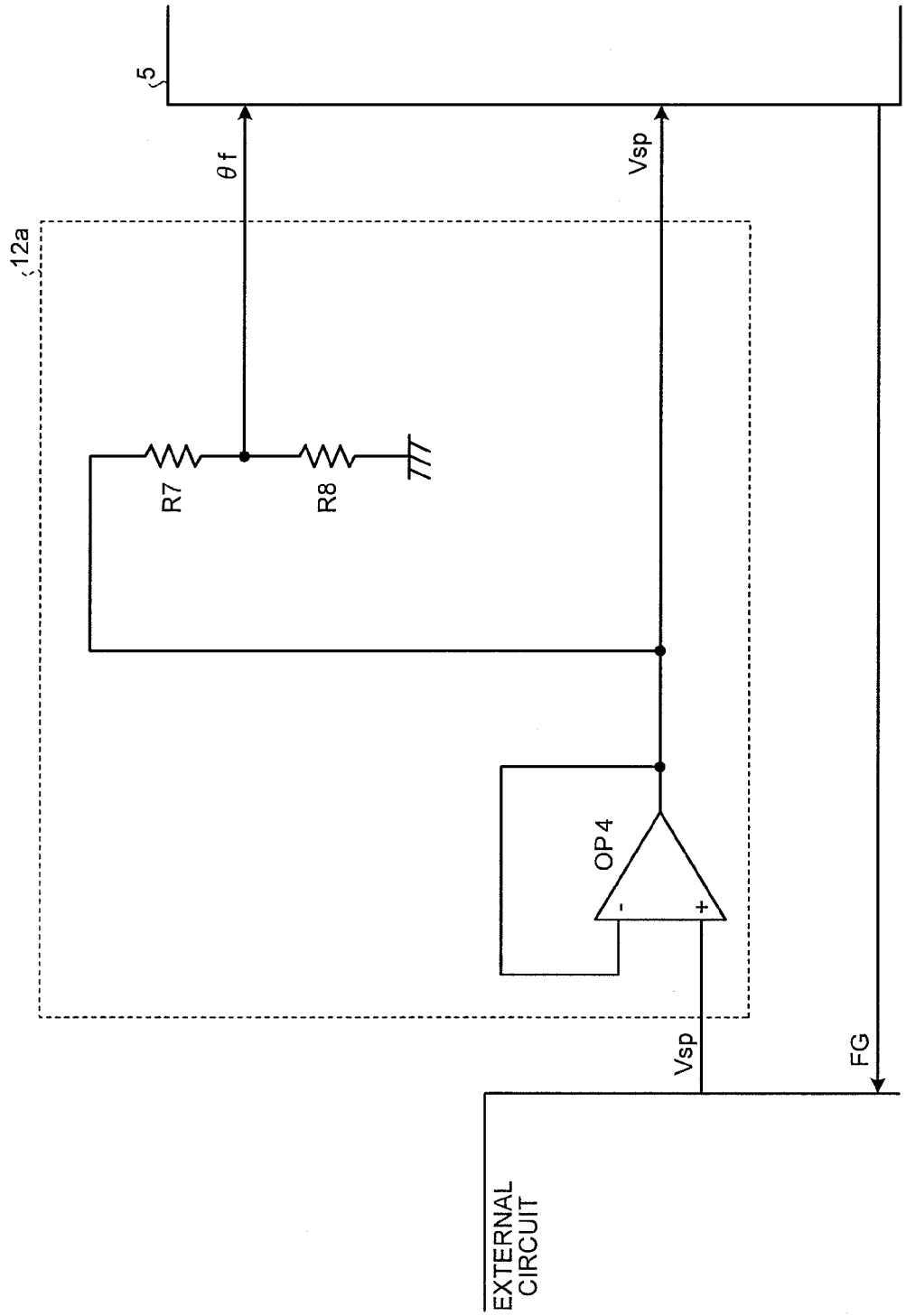
FIG. 12 is a diagram of a circuit configuration example of a voltage-phase adjusting unit in the second embodiment.

FIG. 12 is a diagram of a circuit configuration example of the voltage-phase adjusting unit 12a in the second embodiment. The voltage-phase adjusting unit 12a is configured by an operational amplifier OP4 and resistors R7 and R8. A rotating speed control signal Vsp generated from an external circuit is input to the voltage control unit 5 and a voltage dividing circuit formed by the resistors R7 and R8 via a voltage follower circuit formed by the operational amplifier OP4. The voltage dividing circuit multiples the input rotating speed control signal Vsp with R8/(R7+R8) and outputs a value obtained as a result of the multiplication to the voltage control unit 5 as the voltage advance angle θf.

Figure 13:
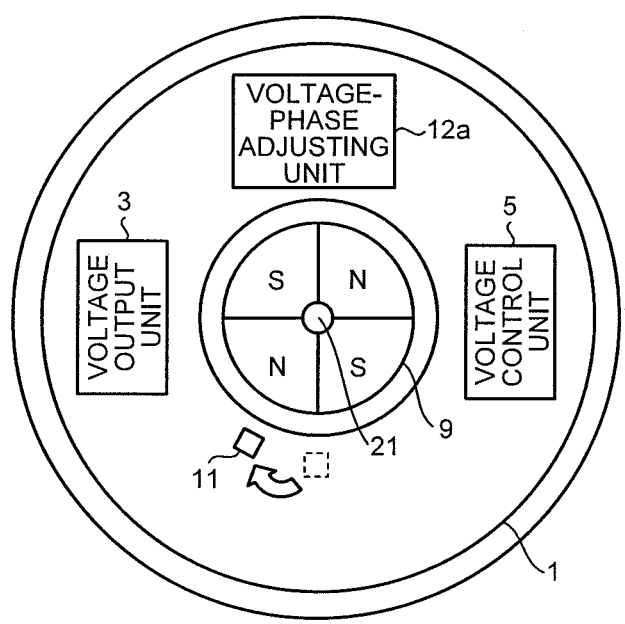
FIG. 13 is a diagram of an arrangement of a magnetic-pole-position detecting unit in the second embodiment.

When the voltage advance angle θf is generated only by multiplying Vsp with R8/(R7+R8) using the voltage dividing circuit, as in the control by the conventional method shown in FIG. 7(a), the voltage advance angle θf is made excessively large at low speed, and there is a concern about, for example, an increase in heat generation and noise due to a current increase. Therefore, in this embodiment, as shown in FIG. 13, an attachment position of the magnetic-pole-position detecting unit 11 is rotated around the shaft 21. That is, the magnetic-pole-position detecting unit 11 is attached to a position different from the position in the first embodiment (see FIG. 10).

Figure 14:
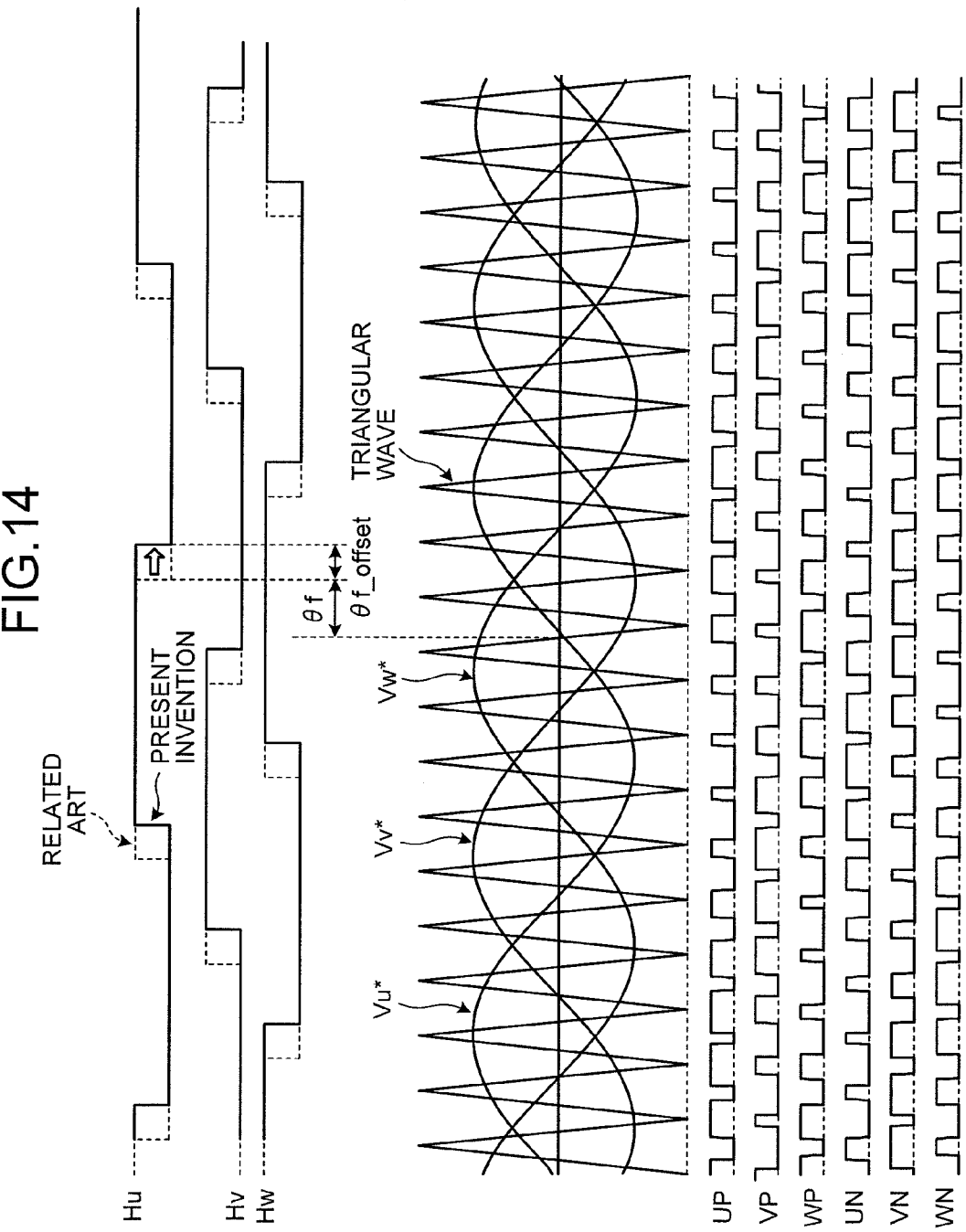
FIG. 14 is a diagram of an example of input and output timings of a voltage control unit in the second embodiment.
Figure 15:
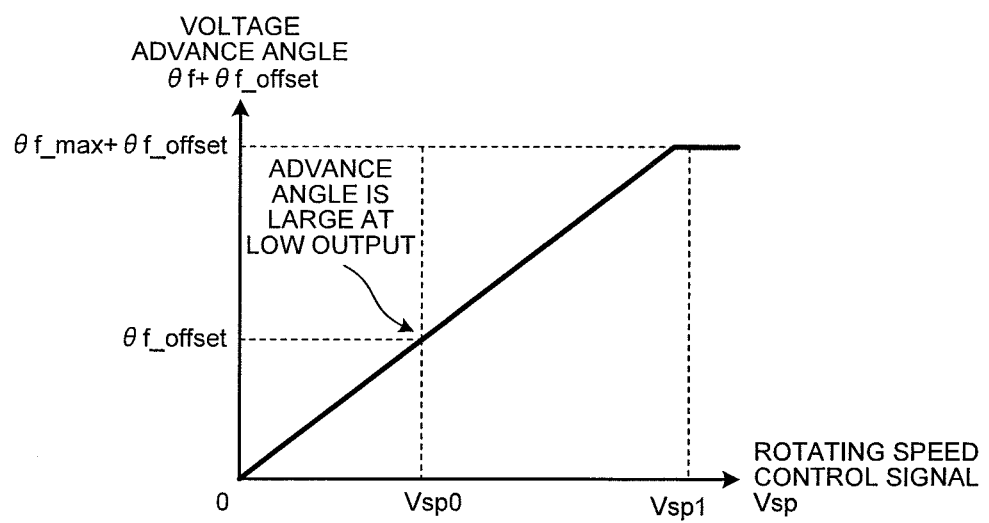
FIG. 15 is a diagram of a relation between a rotating speed control signal and a voltage advance angle in the second embodiment.

When the attachment position of the magnetic-pole-position detecting unit 11 is rotated, a reference position of the rotor 9 and generation timings of the position signals Hu, Hv, and Hw relatively change. Therefore, as shown in FIG. 14, the position signals can be shifted by θf_offset. That is, a substantial advance angle can be reduced to 0 by attaching the magnetic-pole-position detecting unit 11 (rotating the attachment position) such that the position signal is shifted by θf_offset at the time of the rotating speed control signal Vsp=Vsp0 shown in FIG. 15. When Vsp is increased to be larger than Vsp0, a substantial advance angle can be continuously increased from 0. Therefore, it is possible to suppress efficiency deterioration and a noise increase when the rotating speed is low. Because the voltage advance angle θf can be continuously changed, it is possible to solve the problems of the technology described in Patent Literature 1. Specifically, it is possible to reduce the likelihood of occurrence of damage to an apparatus due to a current change and unpleasant noise due to speed fluctuation when the voltage advance angle changes stepwise and realize an operation with improved reliability.

As explained above, according to this embodiment, the effect same as the effect in the first embodiment can be obtained. The number of components of the voltage-phase adjusting unit 12a can be reduced to be smaller than the number of components of the voltage-phase adjusting unit 12 of the first embodiment. The magnetic-pole-position detecting unit 11 is changed only in the attachment position thereof. Therefore, it is possible to realize a motor driving circuit at low costs. Further, it is possible to reduce size and secure reliability through the reduction in the number of components and secure the reliability.

INDUSTRIAL APPLICABILITY

As explained above, the motor driving circuit according to the present invention is useful in driving the permanent magnet synchronous motor and is suitable for, in particular, motor driving circuits that drive fan motors of outdoor machines and indoor machines of an air conditioner and a heat pump water heater, a fan motor for ventilation, and the like.

The invention claimed is:

1. A motor driving circuit comprising:
a rotating-position detecting unit that detects a rotating position of a rotor of a permanent magnet synchronous motor;
a voltage converting unit that converts a direct-current voltage and generates a driving voltage for the permanent magnet synchronous motor; and
a voltage control unit that generates a modulation wave on the basis of the rotating position and a rotating speed control signal for controlling rotating speed of the rotor and controls the voltage converting unit on the basis of a comparison result of the modulation wave and a carrier wave, wherein
the motor driving circuit determines, with a differential amplifier circuit that receives the rotating speed control signal and an offset signal as inputs, a phase of the modulation wave generated by the voltage control unit.

2. The motor driving circuit according to claim 1, wherein the offset signal indicates an offset value at which, in a state in which the rotor is not rotating, the phase is 0° and, after the rotor starts rotation, the phase is advanced according to an increase in the rotating speed.

3. The motor driving circuit according to claim 1, wherein an offset value indicated by the offset signal is a value of the rotating speed control signal at time when the rotor starts rotation.

4. The motor driving circuit according to claim 1, wherein the motor driving circuit generates the offset signal with a voltage dividing circuit formed by at least two or more resistors.

5. The motor driving circuit according to claim 1, wherein at least one of an upper limit and a lower limit is set with respect to the phase, and the voltage control unit generates the modulation wave in a range in which the phase does not exceed a set value.

6. The motor driving circuit according to claim 1, wherein at least one of switching elements configuring the voltage converting unit is formed of a MOSFET.

7. The motor driving circuit according to claim 1, wherein at least one of switching elements and reflux diodes configuring the voltage converting unit is formed of a wide band gap semiconductor.

8. The motor driving circuit according to claim 7, wherein the wide band gap semiconductor is silicon carbide, a gallium nitride material, or diamond.

9. A permanent magnet synchronous motor incorporating the motor driving circuit according to claim 1.

10. A motor driving circuit comprising:
a rotating-position detecting unit that detects a rotating position of a rotor of a permanent magnet synchronous motor;
a voltage converting unit that converts a direct-current voltage and generates a driving voltage for the permanent magnet synchronous motor; and
a voltage control unit that generates a modulation wave on the basis of the rotating position and a rotating speed control signal for controlling rotating speed of the rotor and controls the voltage converting unit on the basis of a comparison result of the modulation wave and a carrier wave, a positional relation between the rotating-position detecting unit and a stator of the permanent magnet synchronous motor is a relation in which a phase of the modulation wave at a point when the rotor starts rotation is 0°.

11. The motor driving circuit according to claim 10, wherein the rotating-position detecting unit is attached to a position where, in a state in which the rotor is not rotating, the phase is 0° and, after the rotor starts rotation, the phase increases according to an increase in the rotating speed.

12. The motor driving circuit according to claim 10, wherein at least one of an upper limit and a lower limit is set with respect to the phase, and the voltage control unit generates the modulation wave in a range in which the phase does not exceed a set value.

13. The motor driving circuit according to claim 10, wherein at least one of switching elements configuring the voltage converting unit is formed of a MOSFET.

14. The motor driving circuit according to claim 10, wherein at least one of switching elements and reflux diodes configuring the voltage converting unit is formed of a wide band gap semiconductor.

15. The motor driving circuit according to claim 10, wherein the wide band gap semiconductor is silicon carbide, a gallium nitride material, or diamond.

16. A permanent magnet synchronous motor incorporating the motor driving circuit according to claim 10.

* * * * *